Aug. 17, 1926.  
L. W. BUGBEE, JR  
1,596,397  
PROCESS FOR MAKING FUSED MULTIFOCAL LENSES  
Filed Dec. 14, 1925

INVENTOR.  
LUCIAN W. BUGBEE, JR.  
BY  
Lockwood & Lockwood  
ATTORNEYS.

Patented Aug. 17, 1926.

1,596,397

UNITED STATES PATENT OFFICE.

LUCIAN W. BUGBEE, JR., OF INDIANAPOLIS, INDIANA, ASSIGNOR, BY MESNE ASSIGNMENTS, TO CONTINENTAL OPTICAL CORPORATION, OF NEW YORK, N. Y., A CORPORATION OF DELAWARE.

PROCESS FOR MAKING FUSED MULTIFOCAL LENSES.

Application filed December 14, 1925. Serial No. 75,357.

This invention relates to an improvement in the process of fusing multifocal lenses wherein the major element is made of glass which melts or softens at a lower temperature than the glass which composes the minor element and in which during the fusing process the major element is superimposed on and covers the minor element and sags down into a fusing engagement with the minor element so as to protect and cover the minor element and keep out dust and foreign particles from the two surfaces to be fused and expels the air from between the two surfaces as the fusing takes place.

The chief feature of this invention consists in supporting the major element in particular relation to the minor element on a block during the fusion of said elements in such manner as to facilitate the expulsion of the air from between the surfaces being fused prior to the element fusion.

The full nature of the invention will be understood from the accompanying drawings and the following description and claims.

Figure 1:
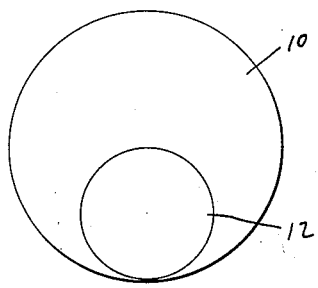
Figure 2:
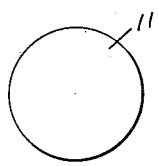
Figure 3:
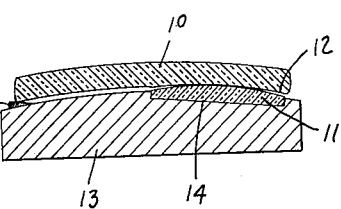
Figure 4:
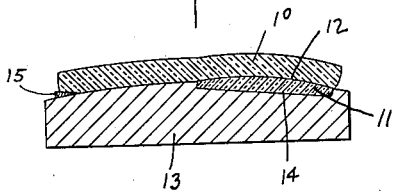
Figure 5:
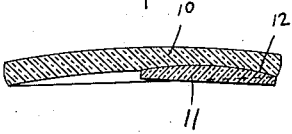
Figure 6:
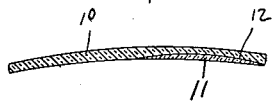
Figure 7:
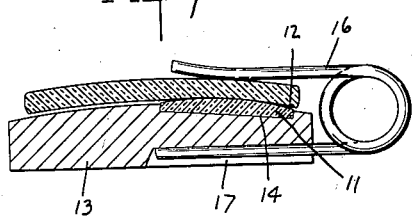
Figure 8:
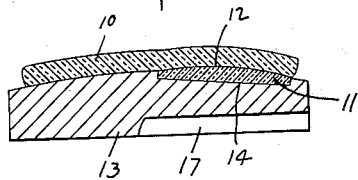
Figure 9:
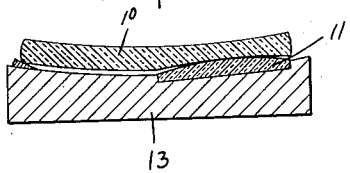

In the drawings, Fig. 1 is a plan view of the major element. Fig. 2 is a plan view of the minor element. Fig. 3 is a central vertical cross section through the elements and a block with which they are assembled preliminary to fusion. Fig. 4 is the same after fusion. Fig. 5 is a similar section of the fused blank. Fig. 6 is a similar section of the finished lens. Fig. 7 is a similar section of a modified way of carrying out the process. Fig. 8 is a similar section after fusion. Fig. 9 shows a modified form with parts arranged as in Fig. 3.

In the drawings there is shown a major element 10 which is made of glass which melts or softens at a lower temperature than the glass forming the minor element 11. The major element has a slight countersink 12 formed therein to receive the minor element. The curvature of the minor element is carefullly and exactly made the same as the desired final curvature so as to determine such final curvature of the fused surfaces in the finished lens. The curvature of the countersink 12 in the major element is not so carefully made and is preferably of less curvature than the curvature of the minor element.

Preliminary to fusion the elements are assembled as shown in Fig. 3 wherein there is a block 13 having a curvature the same as the general curvature of the major element and it has a recess 14 for seating the minor element as shown, so that the margin of the minor element all round will be substantially flush with the surface of the block. The major element is superimposed on the block and minor element as shown in Fig. 3 with the countersink over the minor element and in contact with the central point of the minor element substantially, and the margin of the major element which is remote from the minor element, is supported by a wedge or piece 15, here shown triangular in cross section, mounted on the block 13 so as to support the major element separated from the surface of the block. The edge of the major element rests on the apex of the wedge 15 preliminary to fusion. This will leave a space throughout under the major element excepting at the point where it rests on the central part of the minor element, whereby when the major element sags during fusion all the air will be automatically expelled from beneath the major element and the minor element and block and thus prevent any bubbles being formed in the fused surfaces of the finished lens. Likewise the major element entirely covers the minor element and protects it from dust and foreign particles.

The next step in the process is to fuse said elements together when the parts are assembled as shown in Fig. 3, and their condition after fusing is illustrated in Fig. 4. The sagging of the major element causes its margin to move down over and surround the piece 15 whereby said piece is pushed up into said major portion and the major element comes down flat on the block at all other points and at the same time that it comes down in fusion contact with the minor element. This prevents any bending of the major element thoughout its major surface and the only bending thereof that takes place is the slight sag necessary for its to envelop the curved surface of the minor element. This makes a fused lens of fine quality. The fused blank is illustrated in Fig. 5; and thereafter the blank is finished so as to produce a lens substantially as shown in Fig. 6.

A different means for holding the major element is shown in Fig. 7 where there is a spring clamp 16 with one arm resting on the top of the major element and the other arm resting in a groove 17 in the bottom of the block 13. The arm 16 may act as a spring and the effect of such holding means is to hold the major element in place on the minor element and block so that the major surface of the major element will not contact with the block prior to fusion but will be held apart substantially as shown in Fig. 3 by the piece 15. With the parts mounted in assembly as shown in Fig. 7, prior to fusion, it is obvious that the major element will sag down into fusion contact, as shown in Fig. 8, when subjected to the proper temperature.

The surface of the minor element adjacent to the fusing block should be accurately surfaced to exactly the same curvature of the block, so the button will not warp under heat. Also the wedge 15 might be of glass of a lower melting point than the glass elements.

In the modified form shown in Fig. 9, the process is adapted for use when the countersink is in the convex side of the major element 10. Then the block 13 must be concave.

The invention claimed is:

1. In the process of making fused multifocal lenses wherein there is a major element with a countersink and a minor element to be fused therein, placing the minor element on a block having a curvature approximately that of the curvature of the major element and with the curvature of the minor element extending upward, superimposing the major element on said minor element with a countersink resting substantially on the center of the minor element, mechanically holding said major element on the minor element and block so that the major element will not engage the block preliminary to fusion, and thereafter fusing said elements, whereby the major element will, during the fusing, sag down on the minor element and the block.

2. In the process of making fused multifocal lenses as set forth in claim 1, making the minor element of glass requiring a relatively high temperature to soften it and giving to it the curvature ultimately desired for the curvature of the fused surfaces of the lens when finished, making the major element of glass which will soften at a lower temperature than said minor element and providing therein a countersink for the minor element which is of less curvature than the curvature of the minor element.

In witness whereof, I have hereunto affixed my signature.

LUCIAN W. BUGBEE, Jr.